United States Patent [19] Yamaki et al.

[11] 3,876,416

[45] Apr. 8, 1975

[54] ORE PELLET WITH SULFONATED HYDROCARBON BINDING AGENT AND METHOD FOR PRODUCING SAME

[75] Inventors: Kiyoshi Yamaki, Tokyo; Suzuki Shigeyuki, Kanawaga; Isamu Kaneda, Tokyo; Akira Yamauchi, Iwaki; Yoshio Hirano, Tokyo, all of Japan

[73] Assignees: Kureha Kagaku Kogyo Kabushiki Kaisha, Tokyo; Kawasaki Steel Corporation, Kobe-shi, Hyogo-ken, both of, Japan; part interest to each

[22] Filed: Apr. 20, 1973

[21] Appl. No.: 353,083

Related U.S. Application Data

[63] Continuation of Ser. No. 71,206, Sept. 10, 1970, abandoned.

[30] Foreign Application Priority Data

Sept. 18, 1969 Japan ............................... 44-73618

[52] U.S. Cl. ....................... 75/4; 106/274; 106/275

[51] Int. Cl. ......................... C21b 1/26; C22b 1/24

[58] Field of Search ............ 106/274, 275, 71, 206; 75/4

[56] References Cited

UNITED STATES PATENTS

| | | | |
|---|---|---|---|
| 1,209,692 | 12/1916 | Evans et al. | 106/275 |
| 2,299,469 | 10/1942 | D'Antal | 106/274 X |
| 3,309,196 | 3/1967 | Kaneko et al. | 75/94 |
| 3,427,148 | 2/1969 | Peters et al. | 75/4 |

FOREIGN PATENTS OR APPLICATIONS

| | | | |
|---|---|---|---|
| 1,047,105 | 12/1958 | Germany | 75/4 |
| 18,402 | 2/1930 | Australia | 106/274 |

*Primary Examiner*—A. B. Curtis
*Attorney, Agent, or Firm*—Wenderoth, Lind & Ponack

[57] ABSTRACT

Ore pellets prepared by binding fine ore with a particular binding agent consisting of water-soluble sulfonic acid of hydrocarbon compounds, or its salt.

9 Claims, No Drawings

ORE PELLET WITH SULFONATED HYDROCARBON BINDING AGENT AND METHOD FOR PRODUCING SAME

This is a continuation, of application Ser. No. 71,206, filed Sept. 10, 1970, now abandoned.

BACKGROUND OF THE INVENTION

The present invention relates to pellets or briquettes obtained by binding fine ore with addition of a sulfonic acid of a polycyclic aromatic condensate or its salt as a binder, and then subjecting the pelletized ore to drying and firing processes.

Hitherto, the so-called pig iron has been produced by charging iron ore in a smelting furnace together with coke to reduce the iron ore.

Recently, it has become more and more difficult to obtain high grade iron ore rich in iron content, and even when such iron ores can be obtained, they have to be usually transported from a considerably distant place in the form of fine ore. In other words, there has been increased tendency of using only the fine ore with high iron content. Such high grade fine ore is obtained by subjecting crude iron ore to crushing and grinding at a minining site or from fine iron ore produced at the time of mining in such processes as, for example, magnetic separation.

As is clear from the above, it is of real advantage to constantly obtain fine iron ore containing as high a grade of iron as possible rather than to rely on poor ore (or low grade ore) transported at a considerable expense. However, when this fine ore is directly charged into a smelting furnace as it is, it prevents blast air from smoothly and uniformly flowing within the furnace as well as prevents ore particles from contacting a reducing gas, whereby satisfactory, continuous operation of the blast furnace becomes difficult.

In order therefore to solve the above-mentioned problem, there has been practised efficient production of pig iron by pelletizing such fine ore into pellets or briquettes of a certain definite size, and charging them into a blast furnace. In this case, the size of the pellets or briquettes is determined by a balance between velocity of the reducing gas passing through the blast furnace and reduction speed of the iron ore pellets or briquettes. In general, spherical pellets of 15 – 20mm in diameter are used.

The above-mentioned pelletized ores should have a sufficient mechanical strength not to be disruptive or breakable when they are charged into the blast furnace. They must also have a compressive strength to withstand mechanical stress applied from outside in the course of drying and firing processes at the time of pelletization as well as to withstand the thermal shock caused by rapid heating to a high temperature.

For the purpose of pelletizing fine iron ore, bentonite has heretofore been used as an additive, the quantity of which is about 1% in the case of the fine iron ore containing some amount of moisture. While bentonite exhibits an excellent binding property, it has considerably wide variations in its binding property depending upon the place of origin thereof, on account of which acquirement of bentonite of uniform quality is very difficult. Moreover, although the bentonite itself is a natural resource, hence of low cost, the recent trend is that, due to shortness of hands, difficulty in mining the natural product gradually increases, hence the market price of the product is becoming higher. In other words, the present situation is such that, as the quantity of the bentonite necessary for the iron-making is very large, it has become extremely difficult to ensure constant acquirement at a low price of bentonite having a uniform quality as the binder for pelletization.

On the other hand, purity of the pelletized iron ores is lowered by the addition of the bentonite, for the added portion thereof as an impurity, whereby the coke ratio in the blast furnace increases to hinder productivity. Furthermore, the addition of the bentonite necessitates addition of lime to increase the fluidity of the slag and separation of metal and the slag.

Under such circumstances, an inexpensive binding agent having a constant and uniform quality is particularly demanded in this field of industry. It is also strongly demanded that such binding agent perfectly decomposes in the course of pelletization firing process) and does not leave any residue whatsoever.

SUMMARY OF THE INVENTION

Therefore, it is an object of the present invention to provide pellets or briquettes of ores of various sorts, which are produced by addition of a particular binding agent to be described hereinafter.

It is another object of the present invention to provide ore pellets or briquettes having least swelling property when treated in a blast furnace as well as high compressive strength.

It is still another object of the present invention to provide a method for producing such ore pellets by utilizing such binding agent.

Characteristic features, functions and advantages of the invention will become apparent from the following detailed description of the invention.

DETAILED DESCRIPTION OF THE INVENTION

A new and inexpensive binding agent suitable for producing ore pellets or briquettes has been discovered by the present inventors as a result of their various experiments and studies. As this binder is a synthetic product, it can always maintain its uniform quality and steadily low price, is excellent in its pelletizing effect, and perfectly decomposes in the firing process without leaving residues in the resulting product. Furthermore, as the binder can be used in its liquid state, it provides unfathomable advantages such that it can be easily transported through pipe lines, which not only facilitates the material handling, but also enables uniform mixing of the binder with the fine ore to be automatically controlled as well as improves the working circumstances.

The binder to be used in the present invention consists of a sulfonic acid of a hydrocarbon compound having a condensed polycyclic structure, or its salt. The condensed polycyclic compound is obtained by subjecting a hydrocarbon oil to a heat-treatment at a high temperature. The hydrocarbon oil used herein as the raw material designates crude oil or its distillates, extracts and residual materials which are obtained by distillation or extraction of the crude oil such as, for example, gas oil, kerosene, naphtha, heavy oil, asphalt, asphaltene and the like. Moreover, decomposed oil which is a by-product of naphtha cracking for production of olefin, or its distillate or residual materials can be used. Furthermore, coal tar obtained from coal can be used as the raw material.

The method of preparing the binder according to the present invention will be described hereinbelow.

The raw material is used singly or in the form of a raw mixture with other raw materials. This raw material or raw mixture is firstly subjected to heat-treatment for a reaction time of from 0.5 to 0.0001 second, preferably from 0.1 to 0.005 second at a temperature of from 700°C to 2,000°C by means of an external heating method using a pipe-heater, or an internal heating method using a high temperature gas such as superheated steam or flame, and then the heat-treated raw material is cooled by an appropriate method to separate gaseous substance such as olefin, thereby producing a tarry substance. This tarry substance itself or its distillates and/or distillation residue are made the raw material for the subsequent sulfonation. In the present invention, therefore, the tarry substance includes pitchy substance.

The material for sulfonation which is obtained in the above heat-treatment conditions has been verified, to our surprise, by various sorts of measurements such as infrared absorption spectrum, N.M.R. (nucleomagnetic resonance absorption spectrum), gas chromatograph, elementary analysis, molecular weight, and molecular weight distribution, etc. to be a substance of high aromaticity having characteristics which is extremely analogous at any time irrespective of using various kinds of raw materials as mentioned in the above.

The above-mentioned material has the following structure and composition, i.e., it is a mixture with a substance having a condesned polycyclic structure containing more than two rings and containing therein some numbers of aliphatic chain as its principal constituent, the mean molecular weight and H/C atomic ratio of the material being 160 – 15,000 and 0.3 – 1.25, respectively. The upper limit of the mean molecular weight and the lower limit of the H/C atomic ratio are determined as the limits capable of producing a water-soluble sulfonated substance, while the lower limit of the mean molecular weight and the upper limit of the H/C atomic ratio are determined by a critical point, at which the thus obtained sulfonated substance loses its effectiveness as a binding agent. The binder material does not exist as a pure substance, but exists or is taken out for use in the form of a mixture consisting of a plurality of substances.

This high aromatic material is then subjected to a sulfonation treatment. This treatment can be easily carried out by sulfuric acid, fuming sulfuric acid, sulfuric anhydride, chlorosulfonic acid, and other sulfonating agents which are generally used.

Sulfonation conditions depend upon the kind of the sulfonating agent to be used. In general, the stronger the sulfonating agent to be used is, the milder should preferably be the reaction conditions; in other words, the reaction should preferably proceed gradually at a lower temperature. If necessary, the reaction may be carried out in an appropriate solvent. For example, it can be carried out in a single or mixed solvent which does not, or is difficult to, react with the sulfonating agent. Examples of such solvent are: (1) paraffin or cycloparaffin such as n-hexane or cyclohexane; (2) halogenated aliphatic hydrocarbons like chloroform, carbon tetrachloride, ethylene dischloride, ethane dichloride, and ethylene tetrachloride (perchloroethylene); (3) aromatic halogenated hydrocarbon like orthodichlorobenzene; (4) or dioxane, pyridine, nitrobenzene, or liquid sulfurous acid.

The reaction temperature also depends upon the kind of the reagent and the intended degree of sulfonation, although a very wide range of from −20°C to 200°C can be generally adopted. Though the degree of sulfonation may be arbitrarily controlled by suitably selecting the kind of the sulfonating agent and the reaction conditions, it is the minimum requirement that the sulfonation should be necessarily continued until substantial parts (more than 70%) of the high aromatic hydrocarbon material is converted to be water-soluble. This degree of sulfonation, on the other hand, can be represented in terms of the sulfur content in the sulfonated product, which is about 10 –30 weight percent.

After the sulfonation treatment is complete, the sulfonated substance can be used as it is, but when the substance is further neutralized with any organic or inorganic basic material such as caustic soda, caustic potash, calcium hydroxide, ammonia, sodium phosphate, triethanolamine, morpholine, and the like, the corresponding sulfonates can be obtained. On the other hand, depending on the circumstances, not only a single kind of salt, but also a mixture of more than one kind of basic substance is added to the sulfonated substance to neutralize it so as to augment the effect of the sulfonate as the binding agent.

At the neutralizarion, there is produced from time to time a salt as a by-product owing to excess acid. This by-product salt may be used as it is, or may be separated from the sulfonate depending on necessity.

The sulfonic acid or sulfonate of the polycyclic aromatic substance thus obtained is added to fine ores in the adding quantity of more than 0.05 wt %, or, in the range of from 0.05 wt. % to 4.0 wt. % with respect to the fine ore. A preferable range of adding quantity is from 0.1 to 2.0 wt. %. With the adding quantity below 0.05%, the binding action cannot be sufficiently exhibited, while, with the quantity above 4.0%, the binding action is sufficiently exhibited, but economical merit of providing the low-priced binder would be reduced. The particle size of the fine iron ore for ordinary use is below 325-mesh.

The sulfonic acid or sulfonate of polycyclic aromatic substance can be singly added to the fine iron ore, but may also be added together with other binders such as bentonite, clay, sulfonated lignine, cemental binder, or with surface active agent. Furthermore, the sulfonic acid or the sulfonate may be used together with an additive such as lime, or calcium hydroxide, or the like, in a quantity of about 2 – 10 wt. % with respect to the quantity of the fine iron ore.

As mentioned above, the sulfonic acid or its salt obtained by heat-treatment of condensed polycyclic hydrocarbon has been found to have various advantages such that it can be inexpensively and easily produced, exhibits remarkable water solubility and binding effect when used to pelletize fine iron ore, by which excellent pellets or briquettes can be produced from the fine ore. Since the binding agent can be added to fine ore in the state of water solution, uniform mixing can be attained thereby to obtain pellets having high mechanical strength. Such excellent binding action is applicable not only in pelletizing fine iron ore, but also in pelletizing other mineral ores such as zinc, copper and the like. It has been confirmed that excellent pellets similar to that in the case of iron ore can be obtained with these ores.

It is surprising to note that the iron ore pellets according to the present invention has a very advantageous properties such that, when the pellets are subjected to a reduction, swelling phenomenon least occurs. Accordingly, there is no apprehension of the furnace operation being hindered due to the swelling in the course of the reduction, or breakage and disintegration of the pellets due to decrease in its mechanical strength caused by the swelling, hence effective utilization of the pellets in a blast furnace.

It is furthermore possible to convert this pellets into reduced pellets having large apparent specific gravity and high mechanical strength by subjecting the pellets to reduction in an atmosphere containing a reducing gas such as hydrogen or carbon monoxide by utilizing various reductive furnaces. The reduced pellets thus obtained can be directly utilized as a raw material for steel-making.

In the present invention, even when powdery carbon materials such as coal or coke is mixed with the fine iron or in a quantity of less than 20 wt % with respect to the quantity of the fine ore, pellets having excellent mechanical strength, reducibility, and the least swelling property can be obtained.

As is clearly understood from the above-mentioned facts, the ore pellets and reduced pellets according to the present invention would greatly contribute to the iron-steel industries of the present and future, where utilization of fine ore has been taken up as an important problem in the world.

PREFERRED EMBODIMENTS OF THE INVENTION

Table 1 indicates in sequence the kind of raw material used for the sulfonation, the method of heat-treatment and its conditions, the distillation conditions of the heat-treated material, the method of sulfonation, and the kinds of resulting salt.

Tables 2 to 4 indicate test results of the binding effect of the binding agent with respect to fine iron ore in comparison with that of bentonite.

The heat-treatment of the raw materials shown in Table 1 was carried out in two methods; the one is to treat the raw material with super-heated steam of high temperature obtained by a pebble-type regenerative furnace, and the other is to treat the raw material by jetting the same out into a flame, in which no excess oxygen exists. The first-mentioned method is indicated in Table 1 as Steam, and the second-mentioned method as Flame. The tarry substance obtained at this time is also classified in three cases of: (1) directly subjecting it to the sulfonation without distillation; (2) subjecting it to the distillation under a normal or a reduced pressure, and then subjecting a distilled component from the distillation to the sulfonation treatment; and (3) subjecting it to the distillation under a normal or a reduced pressure, and then subjecting a distilled residue from the distillation to the sulfonation treatment.

The sulfonation treatment was conducted by first dissolving or suspending the tarry substance, or its distilled components, or its distilled residue in ethane dichoride of a quantity approximately four times as much as the raw material, and then blowing into this solution or suspension gaseous sulfuric anhydride in case the sulfonation reagent is sulfuric anhydride, or blowing thereinto fuming sulfuric acid, or chlorosulfonic acid, or sulfuric acid in liquid state in case the sulfonation reagent is any one of these acids.

In the case of using the thus obtained sulfonated material in the form of salt, ammonia water, caustic soda aqueous solution, or calcium hydroxide is added to neutralize the acid so as to obtain corresponding sulfonates.

With this sulfonated compound as the binding agent, dry balls for measuring the rupture strength of ore pellets were produced in the following manner. Fine powder (specific surface area 2,300 $cm^2$) of magnetically dressed iron ore concentrate of Canada origin was preliminarily dried so as to contain therein a certain definite quantity of moisture, after which the binding agent of a predetermined quantity in the form of powder or aqueous solution was added to the concentrate, while adjusting the total moisture content to a definite level (approx. 8.5%) in either case.

The same procedure was followed in the cases of using bentonite, or other additives alone, or using the binding agent of the present invention and bentonite or other additives in combination.

Next, pelletization was carried out by operating a disk-type pelletizer of 260 mm in inner diameter and 60 mm in depth, inclined at 45°, and rotating at a rate of 18 rpm. After 15 minutes' operation, pellets of 16 mm in diameter were grown.

Then, the pellets were dried for 12 hours at 105°C in a hotblast type isothermal drier. After the drying, the rupture strength of the dry balls was measured by using a strength measuring instrument in an ordinary method. Further, the dry balls were placed in a container made of stainless steel wire net and fired at 1,200°C to make the fired pellets.

The test results on these dry balls and fired pellets are as consolidated in Tables 1 through 4. It is clearly recognized from the Tables that the strength of green balls and dry balls is improved by applying the method of the present invention. Moreover, these green balls and dry balls are found to be sufficiently durable against external mechanical force, while they are being treated in the drying and firing furnace, so that they are practically useful even in the blast furnace operation.

Table 1

| Example No. | Raw Material | Heat Treatment Method | Temperature (°C) |
|---|---|---|---|
| 1 | Crude oil of Khafji origin | Steam | approx. 1,550 |
| 2 | Naphtha | Flame | 1,200 |
| 3 | Burner fuel oil | Steam | 1,000 |
| 4 | Straight asphalt | Flame | 950 |
| 5 | S & W* Bottom oil | Flame | 900 |
| 6 | Coal tar oil | Steam | 759 |

Table 1 – Continued

| Example No. | Raw Material | Heat Treatment Method | | Temperature (°C) | |
|---|---|---|---|---|---|
| Time (m sec) | Distillation Conditions (indicated in terms of normal pressure conversion) | Sulfonation Treatment | | | |
| | | Reagent | Temp. (°C) | Time (Hr) | Kind of Salt |
| 5 | 450°C Distillation residue | $SO_3$ | 60 | 2 | Na |
| 5 | Not distilled | Sulfuric acid (98% conc.) | 80 | 6 | Na+Ca** (50:50) |
| 5 | 250°C Distillation residue | Fuming sulfuric acid (specific gravity 1.86) | 5 | 4 | $NH_3$ |
| 5 | 350°C Distillation residue | Chlorosulfonic acid (100%) | 20 | 6 | Na |
| 2 | 450°C Distillation residue | $SO_3$ | 55 | 1.5 | Ca |
| 2 | 350° – 450°C Distilled components | Fuming sulfuric acid (specific) gravity 1.86) | 0 | 6 | — |

*Stone-Webster type cracking furnace bottom oil
**mol ratio

TABLE 2

Dropping Strength of Green Balls

| Example No. | Adding Quantity of Binding Agents (wt %) 0 | 0.05 | 0.1 | 0.3 | 0.5 | 1.0 | 2.0 | Binder of the present invention (0.05%) plus |
|---|---|---|---|---|---|---|---|---|
| 1 | 3.5 | 2.7 | 3.8 | 4.0 | 4.1 | 4.3 | 4.7 | 3.7 |
| 2 | 3.2 | 3.5 | 3.7 | 4.2 | 4.5 | 4.8 | 4.9 | 3.6 |
| 3 | 3.0 | 3.3 | 3.7 | 4.0 | 4.3 | 4.4 | 5.0 | 3.4 |
| 4 | 3.4 | 3.5 | 3.6 | 4.3 | 4.5 | 4.6 | 4.7 | 3.4 |
| 5 | 3.5 | 3.7 | 3.8 | 4.1 | 4.3 | 4.7 | 4.5 | 3.6 |
| 6* | 3.3 | 3.6 | 3.8 | 4.0 | 4.1 | 4.3 | 4.5 | 3.6 |
| 7** | 3.2 | 3.3 | 3.6 | 4.0 | 4.2 | 4.3 | 4.4 | — |
| 8** | 3.0 | 3.2 | 3.5 | 3.8 | 4.0 | 4.2 | 4.3 | — |
| Reference Ex. (only bentonite) | 3.3 | 3.4 | 3.6 | — | 3.7 | 4.3 | — | — |

(NOTE) * The fine powder of copper pyrite was used instead of magnetically dressed iron ore concentrate.
** 2.9 weight % of pulverized lime was added to the magnetically dressed iron ore concentrate.
*** 10 weight % of pulverized coke was added to the magnetically dressed iron ore concentrate. (The same binder as in Example 1 was also used in Examples 6, 7 and 8.)

The dropping strength was measured in the following manner: twenty balls were dropped onto an iron plate of 4.5 mm thick from a height of 45 cm; if the number of balls broken at the $n_i$th time is represented by $N_i$ and its strength by S, the strength can be obtained from the following equation:

$$S = \frac{\Sigma n_i N_i}{20}$$

(Rounded to decimal two places, and indicated with the number of times.)

Table 3

Compressive Strength of Dry Balls (kg/pellet)

| Example No. | Adding Quantity of Binder (wt %) 0 | 0.05 | 0.1 | 0.3 | 0.5 | 1.0 | 2.0 | Binder of the present invention (0.05%) plus bentonite (0.5%) |
|---|---|---|---|---|---|---|---|---|
| 1 | 1.3 | 3.1 | 4.7 | 9.3 | 11.5 | 31.1 | 59.4 | 3.3 |
| 2 | 1.4 | 2.9 | 4.5 | 8.9 | 11.2 | 30.5 | 58.6 | 3.0 |
| 3 | 1.3 | 2.7 | 4.1 | 8.0 | 11.0 | 29.5 | 57.9 | 2.9 |
| 4 | 1.5 | 2.5 | 3.9 | 8.0 | 10.5 | 29.7 | 57.9 | 2.8 |
| 5 | 1.3 | 2.8 | 4.0 | 8.5 | 10.5 | 28.9 | 58.4 | 3.1 |
| 6 | 1.4 | 2.9 | 3.9 | 8.1 | 10.7 | 29.4 | 59.1 | 3.1 |
| 7 | 1.5 | 3.2 | 4.9 | 9.7 | 12.1 | 32.4 | 62.4 | 3.3 |
| 8 | 1.3 | 2.7 | 3.9 | 7.8 | 10.2 | 28.6 | 54.1 | 2.8 |
| Reference Ex. (bentonite) | 1.3 | 1.5 | 1.6 | — | 2.5 | 4.0 | — | — |

Table 4

| Compressive Strength of Fired Pellets (kg/pellet) | | | | | | | | |
|---|---|---|---|---|---|---|---|---|
| Example No. | Adding Quantity of Binder (wt %) | | | | | | | Binder of the present invention (0.05%) plus bentonite (0.5%) |
| | 0 | 0.05 | 0.1 | 0.3 | 0.5 | 1.0 | 2.0 | |
| 1 | x | 300 | 310 | 290 | 300 | 310 | 330 | 300 |
| 2 | x | — | 320 | — | — | — | — | — |
| 3 | x | — | 310 | — | 320 | — | — | 300 |
| 4 | x | — | 290 | — | — | — | — | 290 |
| 5 | x | 290 | 300 | 310 | 310 | 310 | 320 | 280 |
| 6 | — | — | — | — | — | — | — | — |
| 7 | x | — | 300 | — | — | 320 | — | — |
| 8 | x | — | — | — | — | — | — | — |
| Reference Ex. (bentonite) | x | x | x | 300 | 290 | 310 | — | — |

(NOTE)

1. *x* signifies that the pellets were broken or cracked during a firing operation and could not retain their shape until the measurement of strength.

2. In each of Example 1 and Reference Example shown in Table 4, a reduction test was carried out in accordance with Japanese Industrial Standards JIS M8713 with the fired pellets whose adding quantity of the binder was 0.5 wt %. That is, 500 gr. of the dry balls were placed in a reaction tube (75 mm in inner diameter) made of heatresistive steel plate (JIS G4304), then while causing a mixture gas of 30 vol % of carbon monoxide and 70 vol % of nitrogen to flow through the reaction tube at a rate of 15 *l*/min, the heating temperature was raised rectilinearly up to 900°C in 2 hours, at which the reaction material was kept for 30 minutes. From the weight measurements made before and after this heat-treatment, the rate of reduction was calculated. Further, the swelling index was measured in accordance with JIS M8715, and the rupture strength was also measured. These results are shown in Table 5. In the case of the present invention, the swelling index is found to be small, the rupture strength to be large, and the rate of reduction to be high. This means that the reduced pellets of superior quality can be obtained by the present invention.

3. The test for the compressive stregnth of dry balls and fired pellets was conducted by placing a ball or pellet between two flat metal plates, and then applying compression force on both plates against the test material to find out a point, at which the ball or pellet is crushed.

Table 5

| Example No. | Adding Quantity of Binding Agent (wt %) | Rate of Reduction (%) | Swelling Index | Compressive strength (kg/pellet) |
|---|---|---|---|---|
| 1 | 0.5 | 74.2 | 6.95 | 113 |
| Reference Ex. (bentonite) | 0.5 | 69.1 | 14.87 | 71 |

What we claim is:

1. A method of producing ore pellets, which comprises: adding to fine ore 0.05 to 4.0 wt. % of a binding agent consisting essentially of a water-soluble sulfonic acid of a hydrocarbon compound having a condensed polycyclic structure or a salt thereof, said binder being obtained by the sulfonation of at least one subtance selected from the group consisting of tarry substances and pitchy substances having substantially condensed polycyclic structures containing more than two rings, an H/C atomic ratio of 0.4 to 1.25, and a mean molecular weight of 160 to 5,000; pelletizing the resulting mixture; drying and thus produced ore pellets; and subjecting said dried ore pellets to firing.

2. A method of producing ore pellets as claimed in claim 1, wherein 2 to 10 wt. % of lime is added to the powder ore.

3. A method of producing ore pellets as claimed in claim 1, wherein after firing, the ore pellets are further subjected to reduction to convert the fired ore pellets to reduced pellets.

4. A method of producing ore pellets as claimed in claim 1, wherein carbon powder of a quantity less than 20 wt. % is added to the powder ore.

5. A method of producing ore pellets according to claim 1, wherein sulfonation treatment is continued until more than 70% of the high aromatic hydrocarbon material is converted to the water-soluble form and the degree of the sulfonation is represented in terms of the sulfur content in the sulfonated product, said content corresponding to about 10–30 weight percent.

6. Ore pellets consisting essentially of pulversized crude ore containing 0.05 to 4.0 wt. % of a binding agent, said binder consisting essentially of water-soluble aromatic sulfonic acid or a salt thereof, said binder being prepared by sulfonating at least one tarry substance or pitchy substance having a substantially condensed polycyclic structure containing more than two rings and an H/C atomic ratio of 0.4 to 1.25 and a mean molecular weight of 160 to 5,000.

7. Ore pellets as claimed in claim 6, in which the fine ore contains 2 to 10 wt. % of lime added thereto.

8. Ore pellets as claimed in claim 7, wherein the fine ore contains carbon powder of a quantity less than 20 wt. % added thereto.

9. Ore pellets as claimed in claim 6, wherein the sulfur content after sulfonation is about 10–30 weight percent in the sulfonated product.

* * * * *